United States Patent
Drummond et al.

(10) Patent No.: US 6,796,490 B1
(45) Date of Patent: Sep. 28, 2004

(54) AUTOMATED BANKING MACHINE SYSTEM AND METHOD

(75) Inventors: Jay Paul Drummond, Massillon, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 120 days.

(21) Appl. No.: 09/966,932

(22) Filed: Sep. 27, 2001

Related U.S. Application Data (60) Provisional application No. 60/237,812, filed on Oct. 4, 2000.

(51) Int. Cl.[7] .............................................. G06F 17/60
(52) U.S. Cl. ....................... 235/379; 235/439; 235/382; 235/462.46
(58) Field of Search ................................. 235/379, 380, 235/472, 381, 491, 439, 462.46, 382

(56) References Cited

U.S. PATENT DOCUMENTS

| | | | | |
|---|---|---|---|---|
| 4,454,414 A | * | 6/1984 | Benton | 705/41 |
| 4,951,044 A | * | 8/1990 | Nelson et al. | 340/7.22 |
| 5,221,838 A | * | 6/1993 | Gutman et al. | 235/379 |
| 6,038,549 A | * | 3/2000 | Davis et al. | 705/35 |
| 6,405,049 B2 | * | 6/2002 | Herrod et al. | 455/517 |
| 6,480,096 B1 | * | 11/2002 | Gutman et al. | 340/5.31 |

OTHER PUBLICATIONS

Waller, Self service terminal, Dec. 13, 2001, US 2001/0051922, U.S. Patent Application Pubilcation.*
Zeitz, Method and appartus for use in providing a discounted call rate for wireless communications, Jun. 27, 2001, EP 1,111,897, European Patent Application.*

* cited by examiner

Primary Examiner—Michael G. Lee
Assistant Examiner—Kimberly D. Nguyen
(74) Attorney, Agent, or Firm—Christopher L. Parmelee; Ralph E. Jocke; Walker & Jocke (57) ABSTRACT

A wireless ATM system (30) comprises one or more wireless ATMs (32, 34, 36) that are operative to wirelessly communicate with a wireless ATM server (38). The wireless ATMs each include a wireless network interface (41). The wireless ATM server includes a corresponding wireless access point or wireless hub (40). Wireless transmission between the wireless ATMs and wireless ATM server is secured with a wireless encryption protocol. The wireless ATM server is operative to communicate with at least one host banking system (46) through at least one public or private network (44). The wireless ATM server is operative to route transaction and event messages between the host banking system and each of the wireless ATMs using a message gateway router (43). The wireless ATM server further includes a firewall (42).

28 Claims, 5 Drawing Sheets

AUTOMATED BANKING MACHINE SYSTEM AND METHOD

CROSS REFERENCE TO RELATED APPLICATION

This Application claims benefit pursuant to 35 U.S.C. § 119(e) of Provisional Application Ser. No. 60/237,812 filed Oct. 4, 2000.

TECHNICAL FIELD

This invention relates to automated banking machines. Specifically this invention relates to an automated banking machine system and method that includes operating an automated banking machine with a portable device in a secure wireless network environment.

BACKGROUND ART

Automated banking machines are known. A type of automated banking machine used by consumers is an automated teller machine ("ATM"). ATMs enable customers to carry out banking transactions. Banking transactions that may be carried out with ATMs may include the dispensing of cash, the receipt of deposits, the transfer of funds between accounts, the payment of bills, cashing checks, receiving money orders and account balance inquiries. The type of banking transactions a customer can carry out are often determined by the capabilities of the particular banking machine and the programming of the machine by the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure an ATM, automated banking machine or automated transaction machine shall encompass any device which carries out transactions including transfers of value.

ATMs often authorize and perform transactions responsive to communications with a host banking system. Such communications generally take place through dedicated or dial-up networks or over telephone lines. As a result ATMs are usually installed in locations which have access to the physical network ports and/or communications lines. If such ports or lines are not present, either the proposed ATM location must be remodeled to include such a physical network connection or the ATM must be installed in a different location. Such land line based network requirements may limit the range of locations where an ATM can be installed. Consequently there exists a need for an ATM that can be installed in locations which may not be readily modified to include a land line based communication network connection or port ATMs are generally operated using input and output devices included in a dedicated user interface on the machine. Generally only one user may operate such a user interface at a time. There further exists a need for an ATM system that can be operated remotely and/or by plural users. There further exists a need for ATM systems which may be produced and operated more economically. There further exists a need for ATM systems that can carry out more types of transactions and which may carry out transactions rapidly and reliably.

DISCLOSURE OF INVENTION

It is an object of an exemplary form of the present invention to provide an automated banking machine at which a user may conduct transactions.

It is a further object of an exemplary form of the present invention to provide an automated banking machine that may be installed in locations which do not have land line based communication network connections and ports.

It is a further object of an exemplary form of the present invention to provide an automated banking machine system that may be operated using portable wireless devices.

It is a further object of an exemplary form of the present invention to provide an automated banking machine system that may be operated by plural users to carry out transactions.

It is a further object of an exemplary form of the present invention to provide methods for operation of an automated banking machine system.

Further objects of other exemplary forms of the present invention will be made apparent in the following Best Modes for Carrying Out Invention and the appended claims.

The foregoing objects are accomplished in an exemplary embodiment of the invention by an automated banning machine that includes output devices such as a display screen, and input devices such as a touch screen and/or a keyboard. The banking machine further includes devices such as a dispenser mechanism for sheets such as currency, a printer mechanism, a card reader/writer, a depository mechanism and other transaction function devices that are used by the machine in carrying out banking transactions.

The banking machine is in operative connection with at least one computer. The computer is in operative connection with the output devices and the input devices, as well as with the sheet dispenser mechanism, card reader and other transaction function devices in the banking machine. The computer includes software programs that are executable therein and that are operative to enable a user to perform transactions with the machine.

The exemplary embodiment of the machine further includes a wireless network interface. The wireless network interface is operative to provide the machine with wireless access to at least one private or proprietary network. In one exemplary embodiment the wireless network interface includes a digital cellular receiver and transmitter in operative connection with the computer. The computer is operative to use the wireless network interface to call out over a digital cellular communication network to form a secure connection with a remote host banking system. Transaction messages may then be communicated between the machine and the host banking system through wireless digital cellular calls.

In an alternative exemplary embodiment the wireless network interface includes a wireless ethernet network interface card in operative connection with the computer. The computer is operative to wirelessly connect to a wireless ethernet hub located within range of the machine. The exemplary wireless ethernet hub is in operative connection with one or more public or private wide area networks that include one or more host banking systems.

In exemplary embodiments, the automated banking machine may be operative to authorize and perform transactions with the host banking system by sending and receiving communications across a wireless connection. The wireless connection enables the exemplary machine to be placed in locations which do not have physical access to a land line based communication network connection or port. For example it may be desirable to place an automated banking machine in a location such as the middle of a room or hallway. Such locations are typically very difficult to wire with a communication port because there is often no adjacent wall or poll to route a network or phone line. Alternative exemplary embodiments may include automated banking machines located on portable structures or on vehicles.

In some exemplary embodiments an automated banking machine may be adapted to provide portable wireless devices with access to a public or private wide area network in operative connection with the machine. In such embodiments, an exemplary wireless network interface of the machine may include a wireless hub, router or gateway device that is selectively operative to give portable wireless devices fee based access to a wide area network such as the Internet. Examples of portable wireless devices include notebook computers, cell phones, PDAs, Palm® compatible devices, Windows CE® devices or any other portable or handheld computing device that has wireless functionality.

When the wireless device initially connects to the machine, information corresponding to an account associated with the portable wireless device may be communicated to the machine. The automated banking machine responsive to the account information may verify that the account is valid by further communicating with a host banking system or other authorization server. Once authorization is verified the machine may give the portable wireless device access to the wide area network In exemplary embodiments the automated banking machine may accept information corresponding to an account such as a credit card or debit card account. Such an exemplary machine may provide access to the wide area network for a fee which is charged to the credit or debit card. Alternatively charges may be made to data representative of monetary value on a smart card or stored in a memory in or operatively connected to the portable device. Such a fee for example may be based on the amount of time the user spends connected to the wide area network, the amount of data being communicated, or a flat fee rate for unlimited access for a certain time period. Exemplary embodiments may accept other forms of payment such as electronic money transferred from the device. Also the machine may accept payment by direct transfer of money from an authorized checking account, savings account or other financial account associated with the portable wireless device to an account associated with the machine. In one or more of the previously described embodiments, the machine may further require the user to enter an identification value, a password or a personal identification number (PIN) that is associated with the user or their account.

In some exemplary embodiments the machine may accept an Internet Service Provider (ISP) account and a password associated with the account. The machine may access an ISP that is associated with the account to determine if the remote device is permitted access. The machine may then report the amount of usage to the ISP and the service provider may bill the owner of the device for the cost of the network usage.

In alternative exemplary embodiments, the banking machine may enable a portable wireless device to conduct transactions with the automated banking machine. Such transactions may include for example the dispense of cash, a balance inquiry, the transfer of funds between accounts, the payment of bills, the deposit of checks, cash, or transfer of electronic money to or from an account, the purchase of tickets, or any other transaction that includes the transfer of value.

For transactions such as the withdrawal of physical cash, exemplary embodiments of an automated banking machine may enable multiple portable wireless devices to perform the majority of the transaction steps at a distance from the machine and then individually prompt each user of a device to come into proximity with the machine and receive the corresponding cash withdrawal. To limit the potential for cash to be dispensed to the incorrect user, the machine may further require the portable wireless device to send a "dispense now" or other message when the user is standing next to the cash dispenser device portion of the machine or is otherwise in position to receive the requested cash.

To reduce the possibility that wireless information may be intercepted by third parties, exemplary automated banking machines may be operative to perform a secure handshaking protocol with each portable wireless device. Such a protocol is operative to establish an encrypted communication channel for passing information between the banking machine and each portable wireless device. Such a protocol may be based on a Secure Sockets Layer (SSL) protocol for example which includes the authentication of digital certificates. Each automated banking machine, or a grouping of associated banking machines, may have their own digital certificates which can be independently authenticated by the portable wireless devices. Such digital certificates can provide the users of the portable wireless devices with assurances that the automated banking machine they are communicating with is a legitimate machine and not an imposter device posing as an automated banking machine for purposes of stealing account number information and identification values.

In exemplary embodiments the automated banking machine may be made in a smaller form factor by eliminating input and/or output devices such as the display screen, keypads, and function keys found in conventional ATMs for example. For such embodiments, the portable wireless devices may include a client software application which provides a user interface on the display device of the portable wireless device for interfacing and performing transactions with the automated banking machine. For example, such a client application may be a downloaded plugin for a browser of the portable wireless device or may be a Java® application operative in a Java Virta Machine of the portable wireless device. Such a client may be based on HTML, WML or XML based documnents received from the machine. In other embodiments the client may be a service that is integrated into the operating system or hardware of the portable wireless device.

The exemplary client may further include a data store which is operative to store a log of transactions performed with the client. The client may further be operative to export the log of transactions to a financial software application such as Quicken® or Microsoft Money®. In other exemplary embodiments the automated banking machine may further be operative to communicate with portable wireless terminals of maintenance users. Such portable wireless devices may include client applications which are operative to facilitate the servicing of the machine remotely.

BEST MODES FOR CARRYING OUT INVENTION

Figure 1:
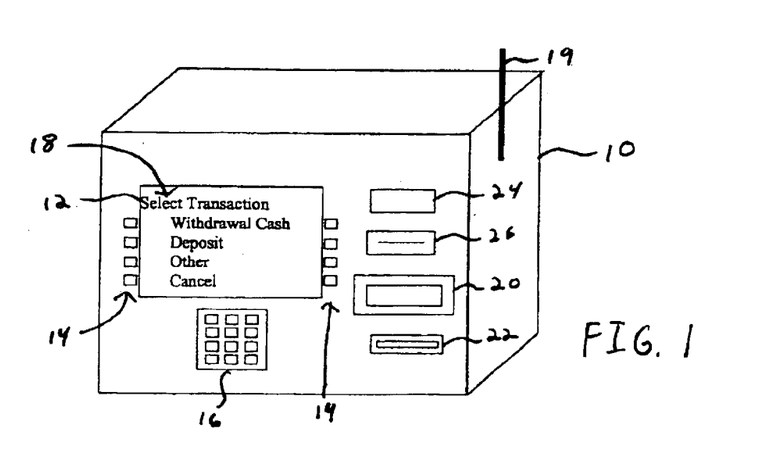
FIG. 1 is a perspective view of an exemplary wireless ATM apparatus used in an exemplary system.

Referring now to the drawings and particularly to FIG. 1, there is shown therein a perspective view of an automated banking machine or ATM 10 of one exemplary embodiment of the present invention. The exemplary automated banking machine 10 includes at least one output device such as a display device 12. The output device 12 is operative to provide a consumer with a user interface 18 that includes a plurality of selectable options for operating the machine. The exemplary embodiment may further include other types of output devices such as speakers, or any other type of device that is capable of outputting visual, audible, or other sensory perceptible information.

The exemplary automated transaction machine 10 includes a plurality of input devices such as function keys 14 and a keypad 16. The exemplary embodiment may further include other types of input devices such as microphones or any other device that is operative to provide the machine with inputs representative of consumer communication The automated banking machine 10 further includes a plurality of transaction function devices such as a sheet or cash dispenser 20, depositor 22, receipt printer 24, and card reader 26. The exemplary automated transaction machine 10 further includes a wireless network interface 19 that is operative to transmit and receive wireless information.

Figure 2:
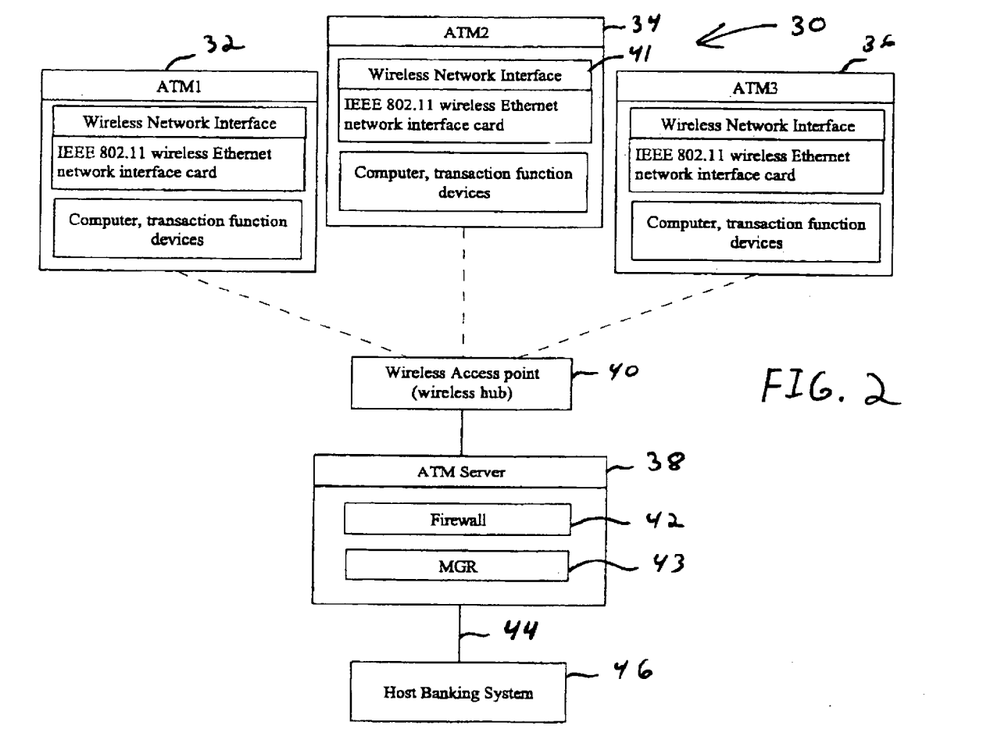
FIG. 2 is a schematic view representative of an exemplary wireless ATM system.

FIG. 2 is representative of an exemplary wireless ATM system 30. The wireless ATM system 30 includes a plurality of wireless ATMs 32, 34, 36. Each of the wireless ATMs is operative to wirelessly communicate with a wireless ATM server 40. In the described exemplary embodiment the wireless ATMs include a wireless network interface 41 such as an IEEE 802.11b wireless network interface card. The wireless ATM server 40 is in operative connection with a wireless access point or wireless hub 40 which is operative to communicate with each of the wireless network interfaces of the wireless ATMs 32, 34, 36. The exemplary wireless ATMs and ATM server provide data security for wireless communications using a wireless encryption protocol such as Wired Equivalent Privacy (WEP) and/or a strong cryptographic algorithm such as RC4 and triple DES.

The exemplary wireless ATM server 38 is operative to communicate with at least one remote host banking system 46 through at least one public or private network 44. The wireless ATM server 38 is operative to route transaction and event messages between the host banking system 46 and each of the ATMs 32, 34, 36. In one exemplary embodiment the wireless ATM server 38 includes a Message Gateway Router 43 (MGR) or other functionally comparable apparatus which is operative to receive, transform and forward messages between a plurality of ATMs and host banking systems. An example of an MGR is disclosed in U.S. Pat. No. 6,039,245 which is incorporated herein by reference in its entirety. In addition the exemplary wireless ATM server 38 further includes a firewall 42. The firewall 42 is operative to prevent unauthorized communications with the wireless ATMs 32, 34, 36. The firewall is further operative to prevent unauthorized communication with the system 30 from a rogue wireless device within range of the wireless access point 40. The firewall is also operative to prevent unauthorized access to the system from external devices communicating through the network 44.

Figure 3:
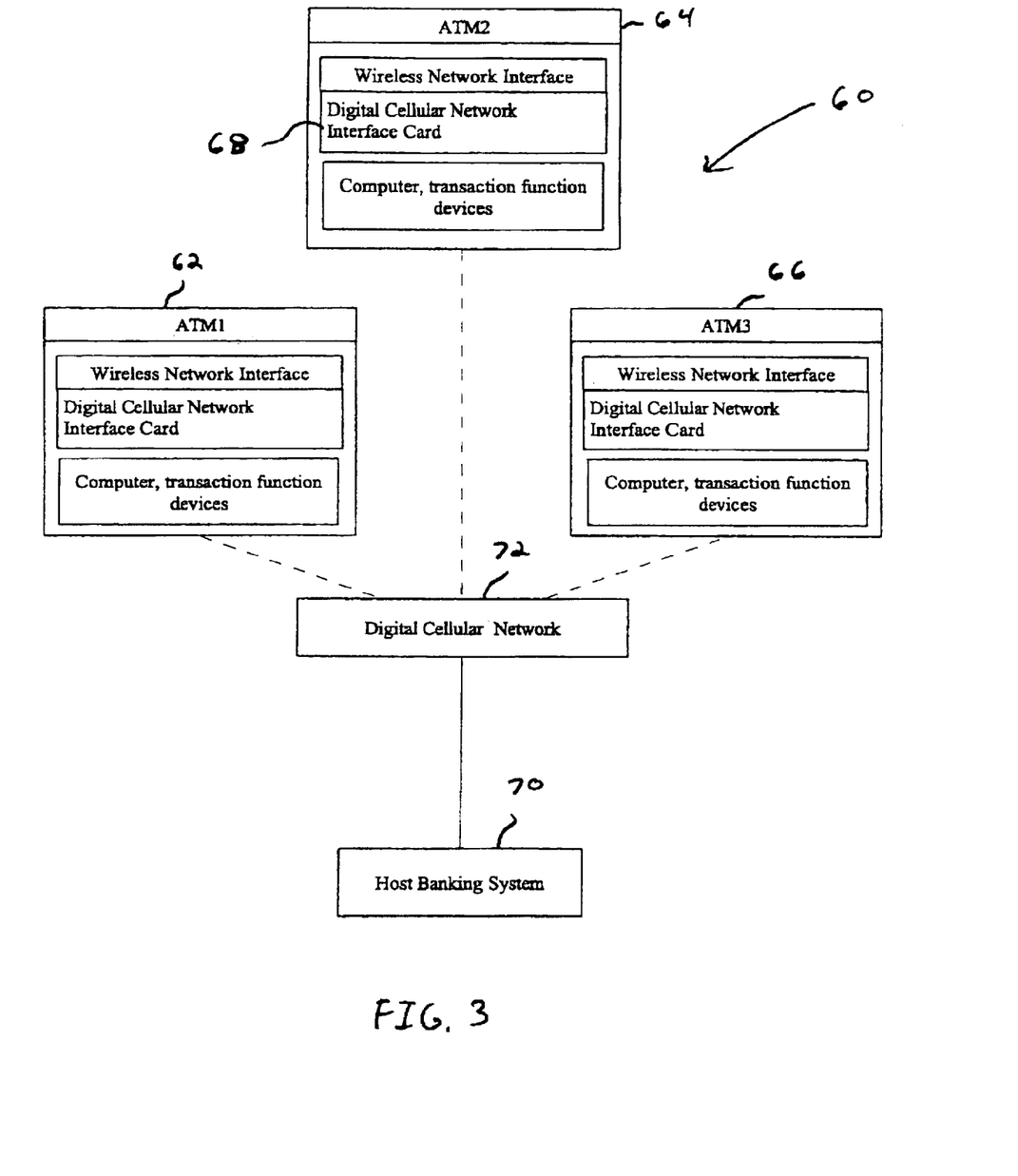
FIG. 3 is a schematic view representative of an alternative exemplary wireless ATM system.

FIG. 3 is representative of an alternative wireless ATM system 60. Here each of the ATMs 62, 64, 66 includes a wireless network interface device 68 such as a digital cellular or mobile phone based network interface card which is operative to communicate with a digital cellular network 72. In this described exemplary system 60 the host banking system 70 is accessed by the ATMs through the digital cellular network 72, rather than calling a host banking system through a land line based network or telephone connection. Examples of cellular networks that may be used include digital cellular based networks such as GSM CDMA, CDPD, or TDMA. Exemplary embodiments may also use the Wireless Access Protocol (WAP) when making calls to the host banking system through a digital cellular network. Communication between the ATM and the host banking system may also be encrypted using an encryption protocol such as Wireless Transport Level Security (WTLS) and Secure Sockets Layer (SSL).

Figure 4:
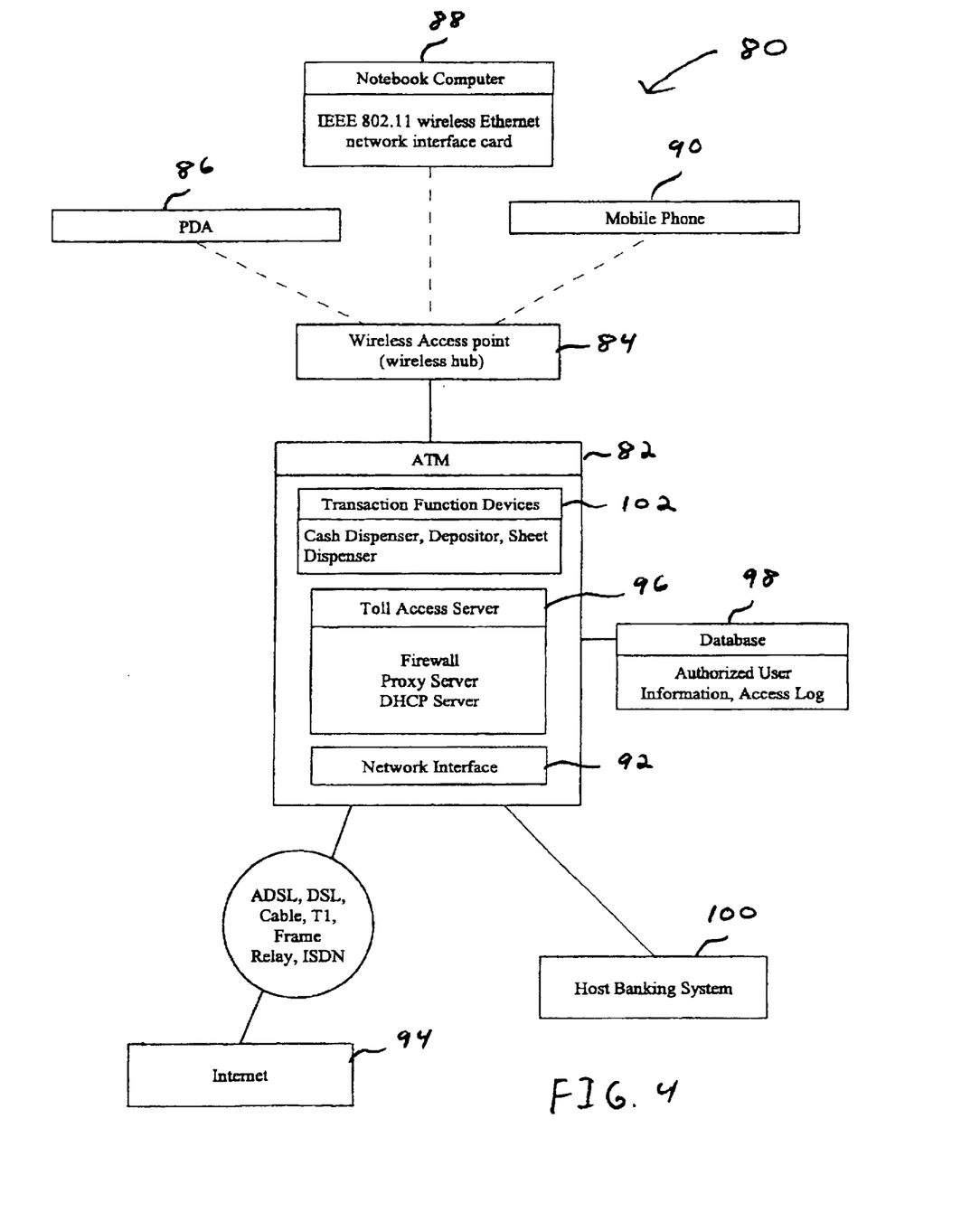
FIG. 4 is a schematic view representative of a further alternative exemplary wireless ATM system.

FIG. 4 is representative of an alternative wireless ATM system 80. Here the system includes an Internet Service Provider (ISP) ATM 82. The exemplary ISP ATM 82 includes transaction function devices 102 such as a cash dispenser, depositor, sheet dispenser, and card reader. In addition the exemplary ISP ATM 82 is in operative connection with a wireless access point or wireless hub 84. The wireless access point is operative to enable the ISP ATM 82 to wirelessly communicate with a plurality of portable wireless devices within range of the wireless access point 84. Examples of portable wireless devices include notebook computers 86, personal digital assistants (PDAs) and mobile phones 90 or other devices which are capable of providing voice communication and/or data communication. In the exemplary embodiment the portable wireless devices include an IEEE 802.11b compatible network interface which is operative to communicate with the wireless access point 84 of the ISP ATM 82. However, alternative exemplary embodiments of the system 80 may use any other wireless network interfaces and systems between the portable wireless devices and the ATM, including for example generally short range RF communication such as Bluetooth™ and IR based systems. Exemplary embodiments may also use a transport protocol such as WAP.

The exemplary ISP ATM 82 further includes an external network interface 92 that is operative to connect the ISP ATM 82 with a public wide area network such as the Internet 94. In one exemplary embodiment the external network interface 92 includes a high speed network connection such as ISDN, ADSL, DSL, Cable Modem, T1, Fractional T1, or Frame Relay. In this described embodiment of the exemplary system 80, the ISP ATM 82 is operative to provide the portable wireless devices 86, 88, and 90 with access to the Internet 94. The exemplary ISP ATM 82 is operative to provide such access for a fee which may be charged to an account associated with a portable wireless device.

The exemplary ISP ATM 82 includes a toll access server software component 96 which is operative to individually provide portable wireless devices with access to the Internet. When a portable wireless device logs onto the ISP ATM 82 for the first time, the toll access server 96 is operative to receive identifying information from the portable wireless device. In one exemplary embodiment the identifying information may include a user ID and password. In other embodiments other identifying values or combinations of values may be used, for example biometric inputs, digital certificates or other indicia usable to identify a user and/or a portable wireless device.

The exemplary toll access server is operative to validate the identifying information by comparison of the user ID and password to a local or remote database 98 of authorized users. Once access is provided, the toll access server is further operative to store a log of parameter information such as the source of data, amount of time and/or amount of transferred data that is used by the portable wireless device. Such a log may be used to calculate a fee for the Internet access which is billed to the user of the portable wireless device.

In an exemplary embodiment, the toll access server may accept identify information from a portable wireless device which is in the form of a financial account such as a credit, debit, checking or savings account. If the account is associated with a password such as a Personal Identification Number (PIN), the toll access server may further require the portable wireless device to provide a PIN along with the account information. The exemplary ISP ATM 82 is operative to charge an access fee directly to the provided account. Such a fee may be based on the amount of time or data usage of the user. The fee may also be based on a one time access fee for unlimited usage for a certain period of time. The exemplary toll access server 96 is further operative to have the ISP ATM 82 authorize and charge the account through communication with a host banking system 100. In alternative embodiments the portable wireless device or a smart card or other memory device associated therewith may include data representative of monetary value, which may be modified through communication with the ATM to pay charges associated with network usage and/or transactions carried out with the ATM such as dispensing cash.

In one exemplary embodiment of the present invention, an exemplary ISP ATM 82 may be located in a publicly accessible location. Such locations may for example include airport terminals, libraries, restaurants, shopping malls, or any other private or public area with a population of users that requires both access to the Internet and access to transaction functions such as cash dispensing.

Figure 5:
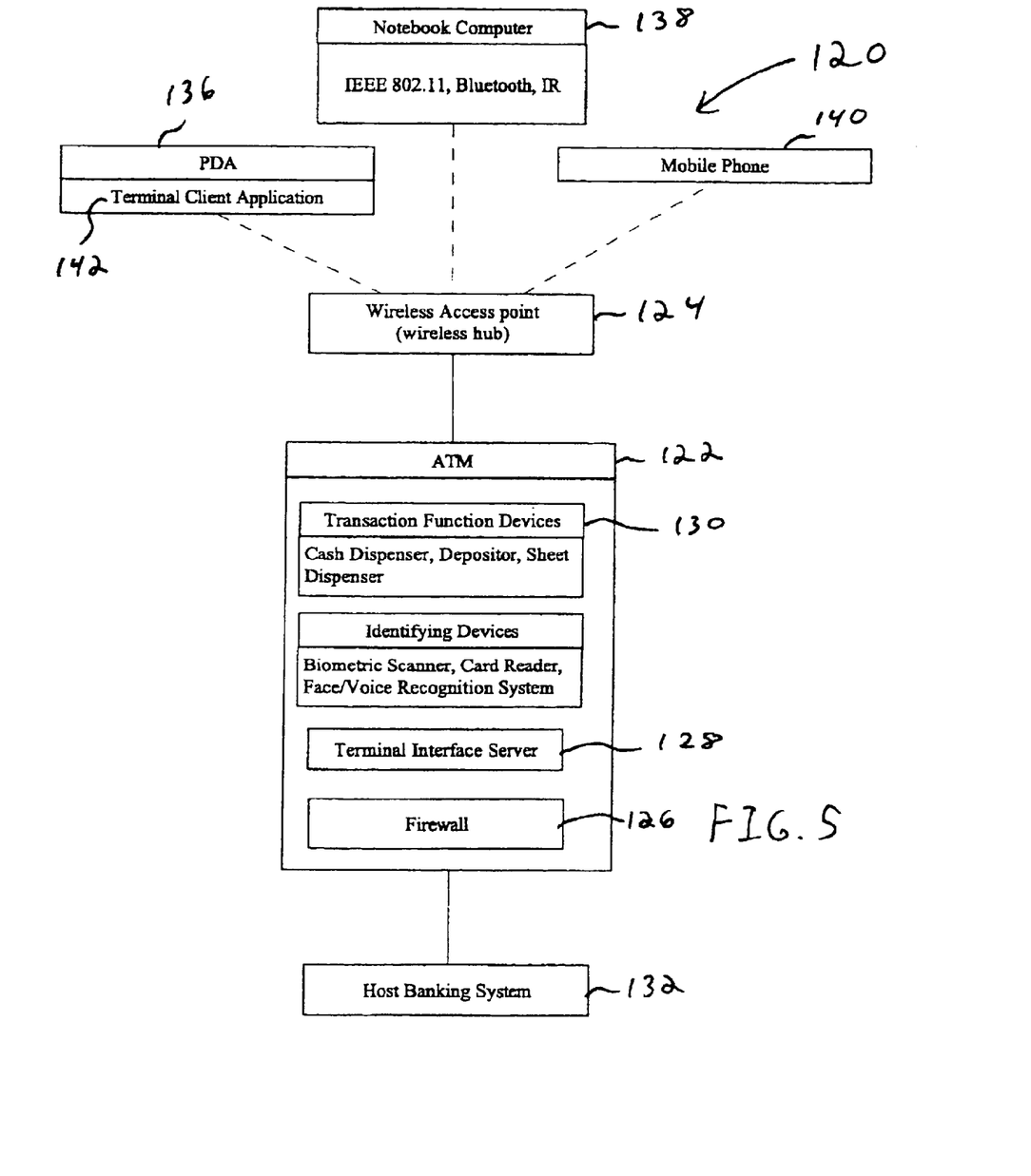
FIG. 5 is a schematic view representative of a further alternative exemplary wireless ATM system.

FIG. 5 is representative of a further exemplary wireless ATM system 120. Here the system 120 includes a wireless enabled ATM 122. The exemplary ATM 122 is in operative connection with a wireless access point or wireless hub 124. A plurality of portable wireless devices 136, 138 and 140 are operative to wirelessly communicate with the wireless access point 124 of the ATM 122. The wireless communication may be based on any wireless system that is operative to securely transport information between the portable wireless devices and the ATM, including IEEE 802.11, Bluetooth™ or any other RF or IR based wireless system. The described exemplary embodiment may also use a transport protocol such as WAP. The ATM 122 further includes a firewall 126 that is operative to reduce the risk of unauthorized communications passing between the portable wireless devices 136, 138, 140 or other devices and the ATM 122.

In addition the exemplary ATM 122 further includes a terminal interface server application 128. The exemplary terminal interface server 128 is operative to provide each of the plurality of portable wireless devices with an individual interface to the ATM 122 for performing transactions. In one exemplary embodiment the exemplary terminal interface server 128 is operative to output HTML, WML, XML or other mark up language based documents for each portable wireless device. Portable wireless devices with an HTML, WML or XML based browser are operative responsive to receipt of the documents to display a plurality of interface screens. The exemplary interface screens include a plurality of selectable options that are representative of transaction functions that may be performed with the ATM 122.

The exemplary terminal interface server is operative to provide each portable wireless device with its own individual and separate access session. As a result each portable wireless device may simultaneously perform transactions with the ATM 122. For example a first portable wireless device 138 may initiate a balance inquiry with the ATM 122 while a second portable wireless device 136 is operative to initiate a transfer of funds between two accounts using the ATM 122. The exemplary terminal interface server 128 is operative to separately maintain a plurality of individual sets of transaction states for each portable wireless device session.

In further exemplary embodiments the portable wireless devices may include a terminal client application 142 that is specifically programmed to log on to the ATM 122 and provide the portable wireless device with an interface for performing transactions with the ATM 122. In an exemplary embodiment the terminal client application 142 may be a hardware independent program such as a Java® applet that is operative to run in a Java Virtual Machine® of the portable wireless device 136. In another exemplary embodiment the terminal client application may be a hardware specific application which is targeted to the specific operating system and/or hardware platform of the portable wireless device 136.

In an exemplary embodiment the exemplary terminal client application is required to be installed on the portable wireless devices prior to enabling the terminal client to initially log on to the ATM 122. However, in an alternative exemplary embodiment the portable wireless devices may be operative to perform a handshaking protocol with the ATM 122 when initially logging on to the ATM. Such a handshaking protocol may provide the portable wireless devices with the initial information and/or terminal client application software which is necessary to perform transactions with the ATM 122. Examples of handshaking protocols which may be used to connect portable wireless devices to an ATM are shown in U.S. patent application Ser. No. 09/505,594 which is owned by the assignee of the present invention incorporated herein by reference in its entirety.

The described exemplary system 120 is further operative to enable two or more portable wireless devices to initiate transactions which require use of the same physical transaction function devices 130 of the ATM. For example, two portable wireless devices may initiate the withdrawal of cash from the ATM 122 at about the same time. When this occurs, the exemplary terminal interface server is operative to contemporaneously authorize each separate withdrawal transaction through communication with a host banking system 132. However because it may be undesirable to dispense both sets of withdrawals in one group or stack of currency sheets, the exemplary terminal interface server is operative to sequentially prompt each user to step forward before dispensing a withdrawal of currency to a user. When a prompted user is adjacent the cash dispenser of the ATM 122, the user may then select an option such as by providing one or more inputs through one or more input devices on his/her portable wireless device which causes the ATM 122 to dispense the cash. Alternatively, the user may be prompted to provide one or more inputs or one or more identification values through one or more input devices on the ATM so as to cause the cash to be dispensed. This described exemplary procedure for prompting a user to sequentially move adjacent to the banking machine may also be applied to other transaction function devices of the ATM 122 such as a check depository, sheet dispenser, or any other physical transaction device which may be needed by multiple users. The ATM may also operate in such circumstances to capture data from a user or an associated article for purposes of verifying or documenting the transaction. For example the ATM may capture biometric data such as a face scan or an iris scan to verify the identity of the person conducting the transaction. The ATM may also capture features of deposited currency, checks or other instruments for correlating information concerning users and deposited items.

In addition to enabling multiple users to wirelessly perform transactions with the ATM 122, the exemplary ATM 122 may further be operative to enable a portable wireless device of a servicer of the ATM to wirelessly perform maintenance operations on the ATM 122. The exemplary terminal interface server 128 may be operative to provide a portable wireless device of a servicer with a set of HTML, WML or XML or other mark up language based documents which provide selectable options for checking error logs, troubleshooting, and performing service or maintenance related tasks with the ATM 122. In alternative exemplary embodiments of the system 120 the portable wireless device of a servicer may include a dedicated service client application which is operative to wirelessly perform maintenance tasks with the ATM 122.

Figure 6:
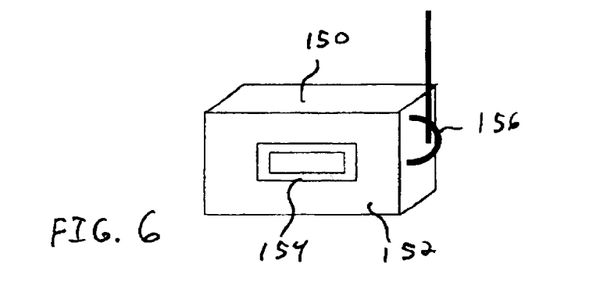
FIG. 6 is a perspective view of an alternative exemplary ATM apparatus.

In the described exemplary embodiment of the wireless system 120, the interactive interface for operating the ATM 122 is created on the portable wireless devices 136, 138, and 140. As a result, exemplary forms of the ATM 122 may be produced in a smaller form factor which does not include one or more of a display monitor, keypad, and/or function keys. An example of such a displayless and keypadless ATM is shown in FIG. 6. Here the ATM 150 includes a publicly accessible fascia 152, and which ATM includes one or more transaction function devices such as a cash dispenser 154. The exemplary ATM 150 further includes a wireless access point 156 which may enable a plurality of portable wireless devices to access the ATM simultaneously. The exemplary fascia 152 of the ATM 150, however, does not include a large display device such as a CRT or LCD based monitor. As a result the ATM 150 may be placed in smaller spaces with limited room for an ATM opening. In addition the ATM 150 may be manufactured at a lower cost due to the elimination of parts associated with the display, keypad, and/or function keys.

Figure 7:
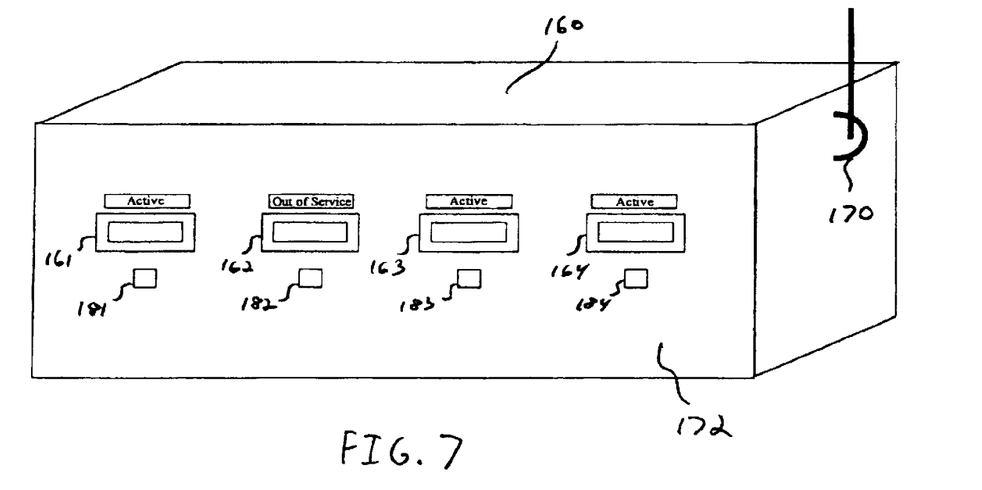
FIG. 7 is a perspective view of an further alternative exemplary ATM apparatus.

FIG. 7 shows an alternative exemplary embodiment of an ATM 160 that includes a plurality of transaction functions devices of the same type. Here the exemplary ATM 160 includes a plurality of cash dispenser outlets 161–164. It should be understood that in some embodiments that ATM may comprise multiple complete cash dispenser mechanisms and in others a single cash dispenser mechanism may deliver bills to transaction function devices such as presenters that deliver bills from the ATM through an outlet. The exemplary ATM 160 includes a wireless access point 170 which may be operative to enable a plurality of portable wireless devices to access the ATM 170 simultaneously. Each of the cash dispenser outlets are spaced apart along the fascia 172 of the ATM 160 such that different individual users may be able to stand adjacent different cash dispenser outlets simultaneously.

The exemplary ATM 160 further includes a plurality of identifying devices 181–184 which are each in association with a transaction function device 161–164. Such identifying devices are operative to receive one or more identification values that can be used to determine an identity of the user and/or the user's portable wireless device or other article that is adjacent a cash dispenser outlet or other transaction function device. By correlating the determined identity of the adjacent user and/or the user's portable device or other article to the portable device performing a traction, the exemplary ATM 160 is operative to have each transaction function device perform the proper transaction function for the corresponding adjacent user.

In one exemplary embodiment the identifying devices 181–184 may include a biometric reader device such as a fingerprint scanner. When a wireless transaction has been authorized, the exemplary ATM 160 may be operative to communicate one or more messages to cause the portable wireless device to prompt the user to step adjacent any available transaction function device 161–164 and press a corresponding fingerprint scanner surface. The exemplary ATM 160 includes a computer that is operative to scan the fingerprint and correlate the fingerprint scan to the transaction. This may be done by correlating the one or more identifying values associated with the fingerprint scan to values in a data store. This may be for example a remote data store which includes data which enables correlation of identification values with particular users, accounts or other identifying data Alternatively, a data store included in the portable wireless device or on another item associated with a user or their account such as a smart card, may include one or more identification values which can be used to verify that the identification data from the fingerprint scan corresponds to the authorized user of the portable wireless device, smart card or other item. Once a fingerprint scan has been correlated to a transaction, the ATM 160 is operative to operate the transaction function device that is adjacent the user to complete the transaction. In alternative embodiments other types of biometric devices may be used, for example a face or voice recognition system, or an iris or retina scan device. In addition alternative exemplary embodiments may use other forms of identifying devices or identifying values or combinations thereof such as a bar code scanner, card reader, IR-sensor, digital certificate, password, PIN or any other device or method which is operative to provide identifying information from a user or an object in the user's possession which can be used to determine that a transaction or user is authorized.

In alternative embodiments the automated banking machine may establish wireless communication with the portable device. The user through the portable device may communicate one or more wireless messages with the banking machine indicating the type and amount of one or more transactions the user wishes to conduct. The banking machine may then communicate with a remote host system to determine if the requested transaction is authorized. The banking machine may then advise the user through a wireless message to the portable device from the banking machine that the transaction is authorized and can be conducted when the user wishes for the transaction to proceed. The user may be notified of the status through output devices on the portable device. The user then may provide one or more further inputs so as to commit to the transaction, which causes a message from the portable device to the banking machine. Such commitment message may be generated when the user is adjacent to the banking machine and may cause the machine to carry out the requested transaction function in response thereto. Alternatively, the user may commit to the transaction and thereafter be required to provide one or more inputs to either the portable device and/or input devices on the banking a machine to carry out the transaction function and complete the transaction. Such approaches may provide greater assurance that the authorized user is in position to receive cash from the machine (or otherwise receive from or provide to the machine transaction items associated with the transaction). This enables users to minimize the time spent at the banking machine. Of course such approaches are exemplary and in other embodiments other approaches may be used.

Thus the new automated banking machine and system of exemplary forms of the present invention achieves at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   (a) receiving with an automated teller machine (ATM) a wireless message representative of a request to establish a wireless connection with a portable wireless device;
   (b) establishing the wireless connection between the ATM and the portable wireless device;
   (c) receiving through the wireless connection a second message from the portable wireless device representative of a request to perform a transaction with the ATM;
   (d) authorizing the transaction through communication between the ATM and a remote host system;
   (e) sending from the ATM through the wireless connection to the portable wireless device an authorization confirmation message;
   (f) receiving through the wireless connection from the portable wireless device a commit transaction message; and
   (g) completing the authorized transaction through operation of the ATM.

2. The method according to claim 1, and prior to step (d) further comprising:
   receiving with the ATM from the portable wireless device through the wireless connection at least one identification value and data corresponding to at least one financial account; and
   wherein step (d) includes sending data corresponding to the at least one identification value and the at least one financial account to the remote host system.

3. The method according to claim 2 wherein the at least one identification value corresponds to at least one biometric input.

4. The method according to claim 2 wherein the at least one identification value corresponds to a digital certificate.

5. The method according to claim 2 wherein the at least one identification value corresponds to a PIN.

6. The method according to claim 1 wherein step (g) includes dispensing cash from the ATM.

7. The method according to claim 6 and further comprising prior to step (g):
   prompting a user of the portable wireless device to move adjacent to the ATM.

8. The method according to claim 7 wherein the prompting step comprises sending at least one prompting message between the ATM and the portable wireless device through the wireless connection.

9. The method according to claim 7 and subsequent to the prompting step and prior to step (g), providing at least one operation input to the ATM, wherein cash is dispensed responsive to the operation input.

10. The method according to claim 9 wherein in step (f) the commit transaction message comprises the operation input.

11. The method according to claim 7 and further comprising:
    receiving with the ATM a further wireless message from a further portable wireless device prior to dispensing cash in step (g);
    and wherein the prompting step includes prompting the user of the portable wireless device and the further portable wireless device to sequentially move adjacent to the ATM.

12. The method according to claim 1 wherein the portable wireless device comprises a voice communication device.

13. The method according to claim 1 wherein the portable wireless device comprises at least one data store including data representative of monetary value, and further comprising modifying the data representative of monetary value responsive to at least one message communicated with the ATM through the wireless connection.

14. The method according to claim 1 wherein the wireless connection comprises an RF connection.

15. Computer readable media bearing instructions which are operative to cause a computer in the ATM to cause the ATM to carry out the method steps recited in claim 1.

16. The method comprising:
    (a) sending with a portable wireless device a first message representative of a request to establish a wireless connection with an automated teller machine (ATM);
    (b) establishing the wireless connection between the portable wireless device and the ATM;
    (c) sending through the wireless connection a second message from the portable wireless device to the ATM representative of a request to perform a transaction with the ATM;
    (d) receiving with the portable wireless device through the wireless connection a third message from the ATM representative of a request to have a user move adjacent the ATM; and
    (e) sending from the portable wireless device through the wireless connection a fourth message to the ATM representative of a request for the ATM to operate a transaction function device.

17. The method according to claim 16, and prior to step (d) further comprising:
    (f) accepting input of a Personal Identification Number (PIN) through the portable wireless device;
    (g) sending through the wireless connection to the ATM data corresponding to the PIN and at least one financing account number.

18. The method according to claim 16, wherein between steps (d) and (e), further comprising:
    (f) outputting at least one message with the portable wireless device responsive to the third message prompting a user of the portable wireless device to approach the ATM and provide at least one input operative to send the fourth message.

19. The method according to claim 16 wherein the portable wireless device comprises a voice communication device.

20. Computer readable media bearing instructions which are operative in a computer to cause the ATM to carry out the method steps recited in claim 16.

21. A method comprising:
   (a) establishing a wireless connection between an ATM and a portable wireless device;
   (b) receiving with the ATM through the wireless connection at least one first message from the portable wireless device representative of a transaction that includes dispensing cash from the ATM;
   (c) authorizing the transaction through communication between the ATM and a remote host system;
   (d) responsive to step (c) sending from the ATM through the wireless connection to the portable wireless device at least one second message that is operative to cause the portable wireless device to prompt a user of the portable wireless device to provide at least one input;
   (e) receiving with the ATM at least one third message generated in response to the at least one input provided by the user, and
   (f) dispensing cash from the ATM responsive to the at least one third message.

22. The method according to claim 21, and prior to (e) receiving the at least one input from the user with an input device of the portable wireless device, wherein in (e) the at least one third message is received with the ATM through the wireless connection from the portable wireless device.

23. The method according to claim 21, and prior to (e) receiving the at least one input from the user with an input device of the ATM.

24. The method according to claim 21, wherein in (d) the at least one second message is operative to cause the portable wireless device to prompt the user of the portable wireless device to move adjacent to the ATM.

25. The method according to claim 21, wherein in (d) the at least one second message is operative to cause the portable wireless device to indicate to the user that the input causes the ATM to dispense cash.

26. Computer readable media bearing instructions which are operative in at least one computer of the ATM to cause the ATM to carry out the method steps recited in claim 21.

27. A method comprising:
   a) providing wireless connection between an ATM and at least two portable wireless devices wherein the at least two portable wireless devices concurrently carry out cash dispensing transactions with the ATM through wireless connection with the ATM;
   b) prompting a first user of a first one of the at least two portable wireless devices to provide at least one first input responsive to communication between the first one of the at least two portable wireless devices and the ATM through wireless connection;
   c) receiving at least one input corresponding to the at least one first input with the ATM; and
   d) dispensing cash to the first user through operation of a cash dispenser of the ATM responsive to receipt of the at least one input in (c); and subsequent to (d);
   e) prompting a second user of a second one of the at least two portable wireless devices, to provide at least one second input responsive to communication between the second one of the at least two portable wireless devices and the ATM through wireless connection,
   f) receiving at least one input corresponding to the at least one second input with the ATM; and
   g) dispensing cash to the second user through operation of the cash dispenser of the ATM responsive to receipt of the at least one input in (f).

28. Computer readable media bearing instructions which are operative in at least one computer of the ATM to cause the ATM to carry out the method steps recited in claim 27.

* * * * *